Nov. 21, 1967  R. REEBER ETAL  3,353,510
APPARATUS FOR SIMULTANEOUS FORMATION OF WORK UNITING
SEAM AND EDGE BINDING SEAM OR SEAMS
Filed April 17, 1964  5 Sheets-Sheet 1

INVENTOR.
RUDOLF REEBER
REINHOLD DOBNER
WERNER TRETOW

Nov. 21, 1967 R. REEBER ETAL 3,353,510
APPARATUS FOR SIMULTANEOUS FORMATION OF WORK UNITING
SEAM AND EDGE BINDING SEAM OR SEAMS
Filed April 17, 1964 5 Sheets-Sheet 3

INVENTOR.
RUDOLF REEBER
REINHOLD DOBNER
WERNER TRETOW

Nov. 21, 1967 R. REEBER ETAL 3,353,510
APPARATUS FOR SIMULTANEOUS FORMATION OF WORK UNITING
SEAM AND EDGE BINDING SEAM OR SEAMS
Filed April 17, 1964 5 Sheets-Sheet 4
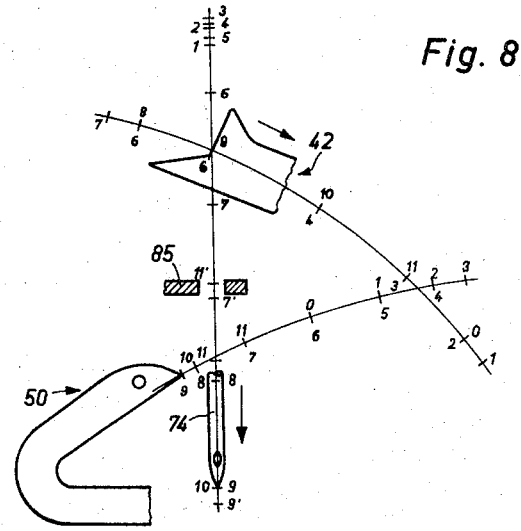
Fig. 8
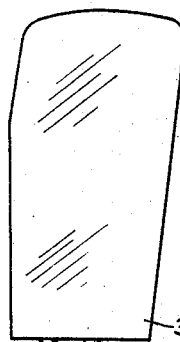
Fig. 9
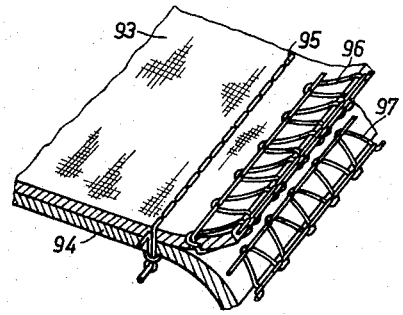
Fig. 11
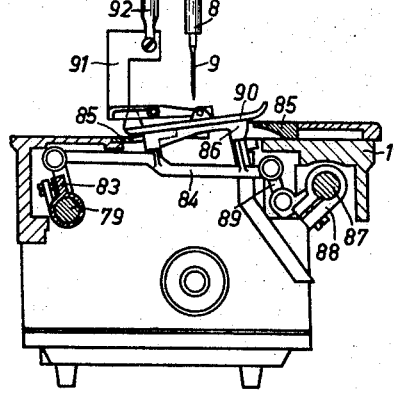
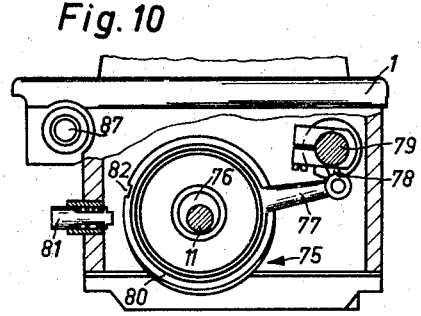
Fig. 10
INVENTOR.
RUDOLF REEBER
REINHOLD DOBNER
WERNER TRETOW Nov. 21, 1967  R. REEBER ET AL  3,353,510
APPARATUS FOR SIMULTANEOUS FORMATION OF WORK UNITING
SEAM AND EDGE BINDING SEAM OR SEAMS
Filed April 17, 1964  5 Sheets-Sheet 5

United States Patent Office 3,353,510
Patented Nov. 21, 1967

3,353,510
APPARATUS FOR SIMULTANEOUS FORMATION OF WORK UNITING SEAM AND EDGE BINDING SEAM OR SEAMS
Rudolf Reeber, Neukeferloh uber Munchen, and Reinhold Dobner and Werner Tretow, Kaiserslautern, Pfalz, Germany, assignors to G. M. Pfaff AG, Pfalz, Germany
Filed Apr. 17, 1964, Ser. No. 360,695
Claims priority, application Germany, Apr. 18, 1963, P 31,622
4 Claims. (Cl. 112—162)

This invention relates to the joining of superposed plies of work material by a chain stitch seam extending in spaced, parallel and adjacent relation to corresponding edges of the material, with binding of at least one of such edges by an overcast stitch seam. More particularly, the present invention is directed to an improved method of and apparatus for forming such chain stitch and overcast stitch seams.

In known sewing machines for performing conjoint chain stitching and overcast edge binding stitching, a double-chain stitch with a small stitch length must be used to obtain a sufficiently tight and close joining of superposed plies at a seam extending in spaced, parallel and adjacent relation to coresponding edges of the two plies, and this necessitates a correspondingly small length of the overcasting stitches. This imposes a severe limitation on the sewing speed, and also requires a considerable increase in the amount of thread for forming the edge seam.

An object of the present invention is to provide a multi-needle chain stitch and overcasting stitch sewing machine capable of operating to higher speeds than known machines of this type.

Another object of the invention is to provide such a machine requiring a substantially reduced amount of thread for forming edge binding seams.

Still another object of the invention is to provide a method and apparatus in which an overcast stitching operation is performed at a rate coordinated with the rate of a chain stitching operation and material feeding, but at a reduced, relative speed with the ratio of speed reduction preferably being a whole number.

A further object of the invention is to provide such a method and apparatus in which the overcasting needle or needles are disengaged from the plies during feeding of the latter to prevent any stitch distortions.

Yet a further object of the invention is to provide a sewing machine of the type described and which is provided with separately operating overcasting arrangements for simultaneous but independent edge seaming of all the plies.

To effectuate the objects of the invention, a chain stitch and overcast stitch sewing machine in accordance with the invention is provided with a drive for the overcasting mechanism having a speed reduction ratio of 1:2 with respect to the chain stitch mechanism and the feeding means for the work material. Coordination of the motion of the overcasting needle or needles with the feeding rhythm of the work material, which latter is advanced twice for each overcasting stitch, is effected within the drive mechanism for the overcasting needle or needles. This coordination preferably is effected by means which retards the oscillatory motion of the overcasting needle, derived from a constant rotation means, in a range above the stitch plate but accelerates such oscillatory motion of the overcasting needle in the range below the stitch plate. By this arrangement, the overcasting needle is disengaged from the plies during the feeding of the materials so that no stitch distortions occur, while being able to form a stitch at substantially the same speed as the chain stitch needle.

As a feature of the invention, separate and independent edge seaming of two plies can be effected by providing two separately operating but coordinated overcasting arrangements. For such separate overcast stitching of the corresponding edges of two superposed plies, a guide member is provided in front of the overcasting devices and oscillates, in rhythm with the overcasting mechanisms, to spread the ply edges as well as to divert those ply edges which are not to be overcast out of the area of operation of the overcasting needle.

Due to the fact that the mass moment of inertia of the material to be sewn limits the oscillation frequency of the guide members to a present value, such oscillation frequency determines the maximum permissible sewing speed of the machine. In the present invention, wherein the number of stitches formed in the overcasting mechanism, as related to the number of stitches formed in the chain stitching, is reduced by a factor of at least 1:2, the oscillation frequency of the guide members for the ply edges is also reduced in like amount, so that the speed of operation of the machine can be very considerably improved or increased.

The driving of the elements of the overcast stitch looping means can be made especially simple and with a space saving design if these elements perform simple oscillatory movements derived from a rotational movement having a sinusoidal velocity curve. To prevent defects and to provide secure stitching, the motion of each overcasting needle is coordinated with the movements of the looping means by providing means, within the drive for the overcasting needle, which decelerates the downward movement of the overcasting needle and accelerates the upward movement hereof.

For an understanding of the principles of the invention, reference is made to the following description of a typical embodiment thereof as illustrated in the accompanying drawings.

In the drawings:

FIG. 8 is a schematic diagram illustrating the various positions of one overcasting needle and its associated looping means during the formation of one stitch;

FIG. 9 is a side elevational view of the machine partly in section and taken essentially on the line IX—IX of FIG. 1;

FIG. 10 is a sectional view taken on the line X—X of FIG. 1;

FIG. 11 is a perspective view illustrating the structure of the seams produced by the sewing machine and method of the invention.

Figure 1:
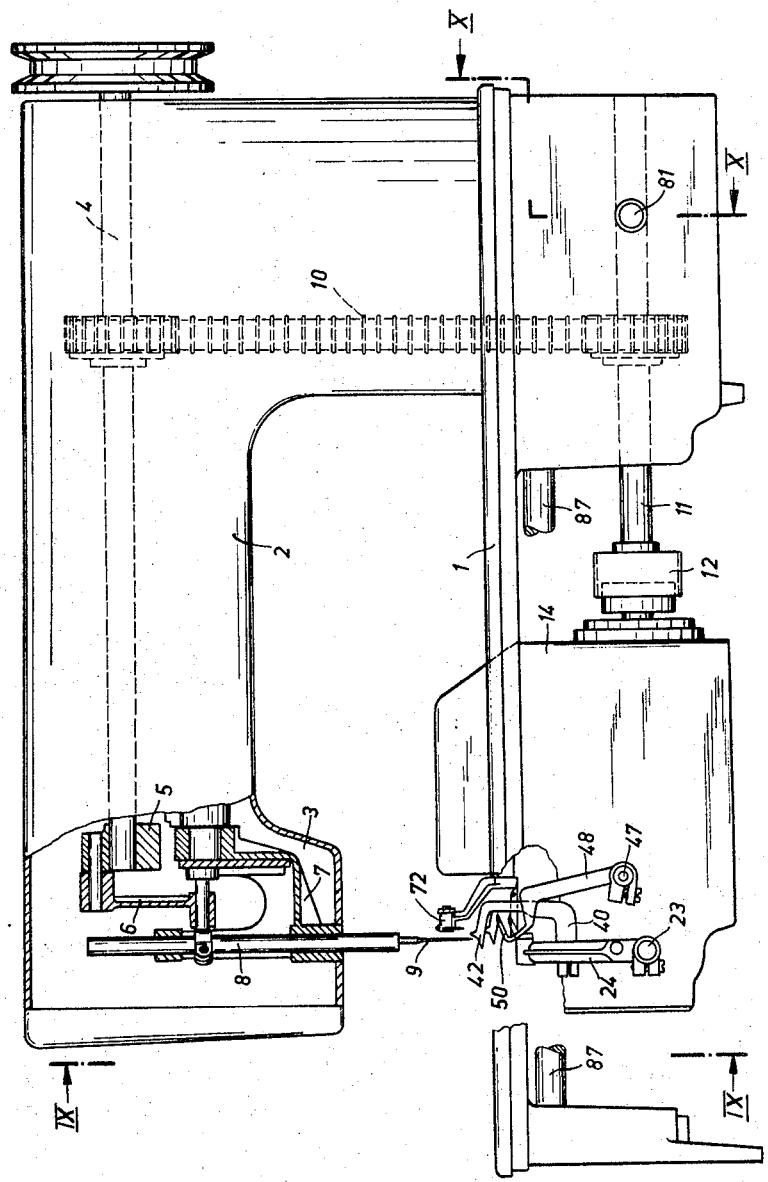
FIG. 1 is a front elevation view of a sewing machine embodying the invention, with some portions being shown in cross section.
Figure 2:
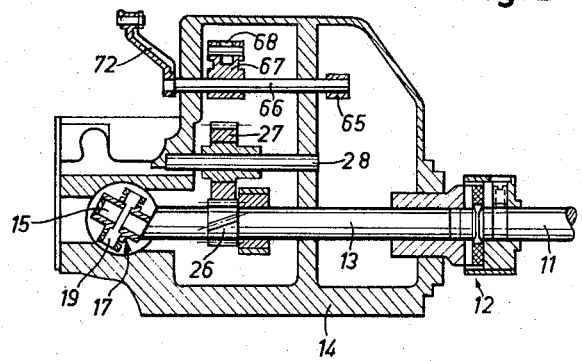
FIG. 2 is a vertical longitudinal sectional view of the gear housing of the machine, looking toward the axis of a lower main drive shaft.

Referring first to FIG. 1, a sewing machine embodying the invention is illustrated as including a platform 1, an arm 2 and a sewing head 3. A driving shaft 4 is mounted in arm 2 and, through the medium of a crank 5 and a guide 6, drives a needle support rod 8 reciprocable in a carrier or guide 7 and having needle 9 supported therein. Through a chain belt 10, driving shaft 4 drives a lower main driving shaft 11 which is positioned beneath platform 1 and connected by a coupling 12 with a driving shaft 13, as also seen in FIG. 2. Shaft 13 is positioned in a gear housing 14 secured to the underside of platform 1 and projecting partly therefrom.

Figure 3:
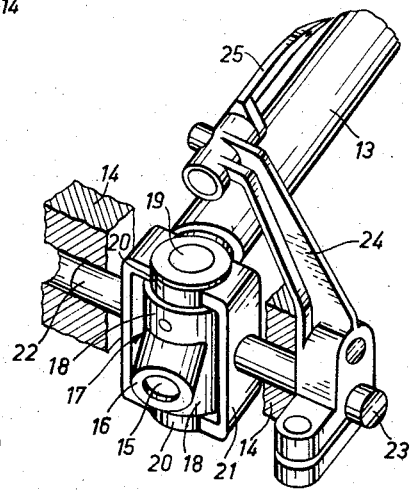
FIG. 3 is a perspective view, partly in section, of the chain stitching forming mechanism.

The front end of shaft 13 is formed as an inclined crank 15, as best seen in FIGS. 2 and 3. Crank 15 extends through two coaxial sleeves 16 of a crossed sleeve device 17. Device 17 has two coaxial sleeves 18 extending perpendicularly to the axis of sleeves 16 and rotatably supporting a bolt or pivot pin 19. Bolt 19 is transversely bored to accommodate inclined crank 15. The ends of bolt 19 protruding from sleeves 18 extend through bearing eyes 20 of a substantially rectangular bracket 21 formed with a journal 22 and a shaft 23. Journal 22 and shaft 23 are coaxial and are perpendicular to the axis of shaft 13, as well as being rotatably mounted in gear housing 14.

The inclined crank drive operates shaft 23 to perform oscillatory axially directed movements. Through a carrier 24 mounted on the free end of shaft 23 projecting from housing 14, the motion of shaft 23 is transmitted to the chain stitch element or looper means 25 to impart an elliptical motion thereto. The oscillatory motion of shaft 23 thus produces the loop catching movement of looper 25. The amplitude of oscillation or reciprocation of shaft 23 is determined by the inclination of inclined crank 15. The amplitude of motion of looper 25 corresponds to the axial displacement of shaft 23, and is determined by the vertical distance of the point of intersection of the axes of crank 15 and bolt 19 from the axis of shaft 13. Looping element 25, in conjunction with needle 9, produces a double chain stitch seam serving as a joining seam uniting superposed plies of work material.

Figure 4:
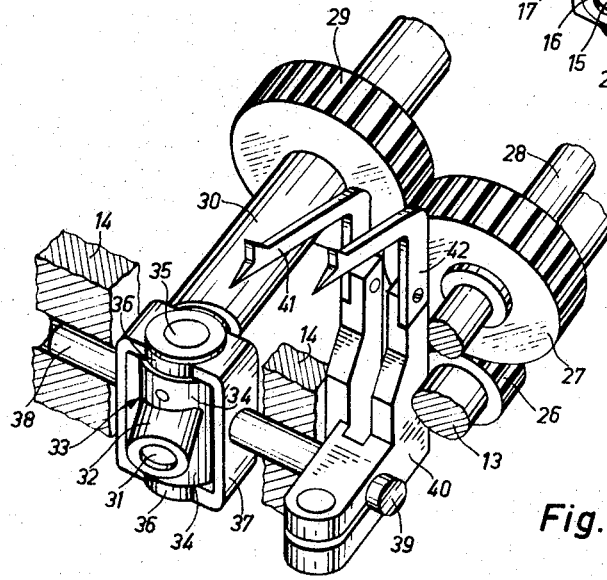
FIG. 4 is a perspective view, partly in section, of the drive mechanism of the upper looping means of the upper overcasting mechanism.

The sewing machine is also designed to produce overcast stitch seams on each of the edges of the plies to be joined. Referring to FIGS. 3 and 4, drive shaft 13 has secured thereto a pinion 26 meshing with a gear 27 which has twice as many teeth as pinion 26. Gear 27 is secured to an intermediate shaft 28 disposed above and parallel to shaft 13, and, as seen in FIG. 5, meshes with a gear 29 equal in size to gear 27 and secured to a driving shaft 30 for the overcasting mechanism which latter is also accommodated in housing 14.

The front end of driving shaft 30 is designed as an inclined crank 31 which extends through two coaxial sleeves 32 of a crossed sleeve device 33. A bolt or pivot 35 is mounted in coaxial sleeves 34 of device 33, and the axis of these sleeves extends perpendicular to that of sleeves 32. Bolt 35 is transversely bored to receive inclined crank 31, and the projecting ends of bolt 35 are embraced by bearing eyes 36 of a rectangular strap-type bracket 37. Bracket 37 is formed with a journal 22 and a shaft 39, which are coaxial and whose axis is perpendicular to the axis of driving shaft 30. Journal 38 and shaft 39 are rotatably mounted within gear housing 14.

Inclined crank 31 actuates shaft 39 to reciprocate axially. Through a carrier 40 mounted on the free end of shaft 39 projecting from the housing 14, the axial reciprocation of shaft 39 is imparted to two upper overcast stitch looping elements 41 and 42. The oscillation of elements 41 and 42, resulting from the offset position of bolt 35 with respect to the axis of shaft 30, while not necessary for the sewing itself, is required for deflecting movement of elements 41 and 42 toward the needles of the overcasting arrangement as described hereinafter.

Figure 5:
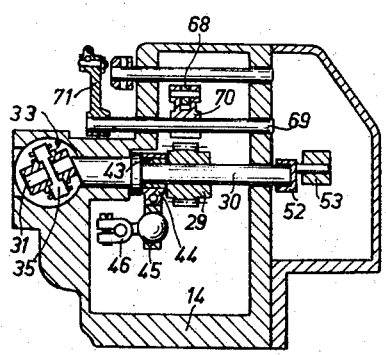
FIG. 5 is a vertical longitudinal sectional view through the gear housing looking in the direction of the driving shaft for the overcasting mechanism.
Figure 6:
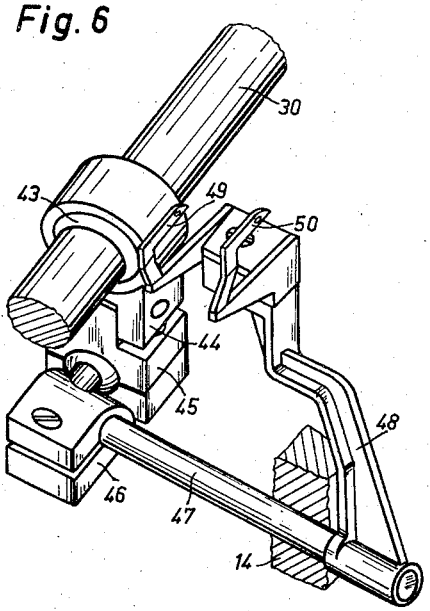
FIG. 6 is a perspective view, partly in section, of the drive mechanism for the lower looping means of the overcasting mechanism.

Referring to FIGS. 5 and 6, shaft 30 carries an eccentric 43 which is embraced by a coupling link 44. A guide 45 is connected through a compensating joint to coupling link 44, and guide 45 is formed with a spherical socket to receive a ball on the end of a lever 46. Lever 46 has a forked opposite end clamped to the end of an oscillatory shaft 47 projecting from housing 14, and is oscillated by eccentric 43 through coupling link 44 and guide 45. Through a carrier 48 secured on the end of shaft 47 which extends from housing 14, these oscillations are transmitted to two thread guiding lower looping elements 49 and 50.

Figure 7:
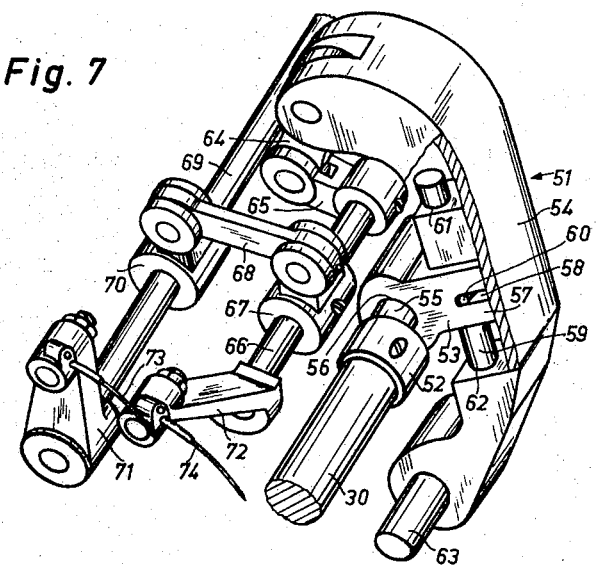
FIG. 7 is a perspective view of the drive mechanism for the overcasting needles.

Referring to FIGS. 5 and 7, the opposite end of driving shaft 30 is operatively connected with an oscillating mechanism generally indicated at 51. Mechanism 51 includes a crank 52 secured to shaft 30, a connecting link 53, and an oscillating member 54. Crank pin 55 of crank 52 extends into a bore 56 in one end of connecting link 53. The other end 57 of link 53 has a slot 58 extending parallel to the axial direction of bore 56, and also has an aperture extending perpendicular to slot 58. This latter aperture slidably receives a cylindrical sliding member or bar 59 provided with a transverse pin 60 engaged in slot 58. Bar 59 thus is rigidly connected to link 53. Bar 59 is slidably engaged in coaxial bores 61 and 62 of oscillating member 54, and thus is reciprocable axially of itself relative to member 54. The lower end of oscillating member 54 is oscillatably supported by a bolt or pin 63 secured in housing 14, and the free end of member 54 has one end of link or pitman 64 articulated thereto.

Crank 52 imparts a circular movement to link 53, and this circular movement is converted, by sliding bar 59 moving within bores 61 and 62, into an oscillatory movement of member 54. As will be understood by those skilled in the art, oscillating mechanisms of the type described have an oscillation which is shorter, in time, in one direction than in the other direction.

Figure 12:
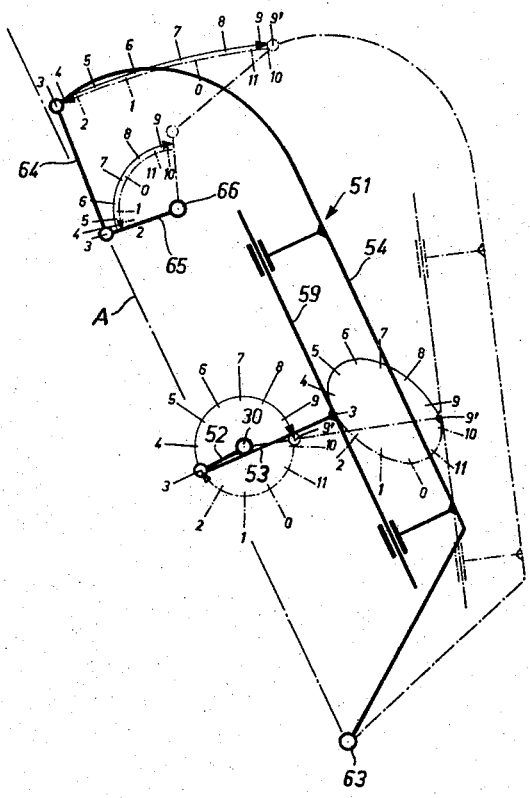
FIG. 12 is a diagrammatic representation of the drive of the overcast needle, illustrating the various positions of individual parts of the drive mechanism during a complete cycle.

FIG. 12 diagrammatically illustrates this situation.

Link 53 is rigidly attached to the sliding bar 59. Due to the sliding movement of the bar 59 the distance between the pivot point 63 and the point of connection of the link 53 to the bar 59 varies from the shortest distance corresponding to position o to the longest distance corresponding to position 6. Since the crank 52 rotates at constant speed, the rate of pivotal movement of the link 54 about the pivot 63 decreases as the link 53 moves from position o to position 6 and increases as the link 53 moves from position 6 to position o. Due to the increase and decrease in the rate of pivotal movement of link 54 as the distance between the pivot point 63 and the point of connection of the link 53 to the bar 59, varies, it takes a longer time for the link 54 to move from position 3 to position 9 than it does for it to move from position 9 to position 3.

The other end of connecting link 64 is articulated to an end of a lever arm 65 secured to a needle oscillation shaft 66. The arrangement of the parts is such that, in the extreme left position of member 54, as viewed in FIG. 7, its fulcrum point 63, its pivotal connection to link 64, and the pivotal connection of link 64 to lever arm 65 are substantially or approximately in rectilinear alignment, and link 64 and lever arm 65, at such time, form an angle of substantially 90 degrees. By virtue of this arrangement, the oscillatory movement imparted by crank and slide device 51 to lever 65 is substantially retarded in the lower oscillating range of arm 65 while being substantially accelerated in the upper oscillation range of lever arm 65.

A crank arm 67 is secured to needle oscillation shaft 66, and a link 68 connects crank arm 67 to a crank arm 70 on a second needle oscillation shaft 69, the two crank arms having the same effective length and being held in parallel relation with each other by link 68. Needle holders 71 and 72 are mounted on the free ends of the respective needle oscillation shafts 69 and 66 extending from gear housing 14. These needle holders 71 and 72 carry longitudinally arcuate overcasting needles 73 and 74, respectively, which, as a result of the described arrangement, perform identical oscillatory movements.

Due to the particular arrangement just described with respect to lever arm 65, link 64 and oscillating member 54 in the upper dead center position of needles 73 and 74, the latter have a much slower motion, while disengaged from the sewing material, than when stitching in the work. Thereby it is possible to produce only one overcasting stitch while two stitches are being formed by the chain stitching mechanism with the work being advanced in synchronism with the chain stitching mechanism. The stitching operations of the overcasting needles 73 and 74, when in the work, are thus performed only after every second step-wise advance of a work feeding means described hereinafter. The time during which the needles are engaged in the work, due to their then faster motion, is therefore limited to the time period between two successive advance movements of the work.

The position of the oscillating device 51, whose return stroke is faster than its forward stroke, further has an effect on the motion of overcasting needles 73 and 74, operated by lever arm 65, so that, despite regular oscillations, with sinusoidal velocity curve, of the looping elements 41 and 42, as well as the looping elements 49 and 50, appropriate stitch producing conditions in relation to the overcasting needles 73 and 74 are provided. Specifically, the upward motion of overcasting needles 73 and 74 is effected more rapidly than is the downward motion thereof.

FIG. 8 shows the synchronized operation of the three coordinated overcasting elements on the front assembly, including overcasting needle 74, lower looper element 50, and upper looper element 42, for producing one of the two overcasting seams. The overcasting elements forming the other overcasting seam, including overcasting needle 73, lower looper element 41, and upper looper element 49, operate in the same manner. The illustrated position of the overcasting elements corresponds to that of the needle 9 of the chain stitch mechanism before the lower dead center position of needle 9. The overcasting elements are then in a position 9.

Overcasting needle 74 is already a considerable distance beneath the work and is approaching the lower dead end position of an oscillatory course. Lower overcasting looping element 50 is in its extreme leftward position, and upper overcasting looping element 42 is moving from a position above the work to a position below the work. With needle 74 moving in an upward direction, lower element 50 begins its movement to the right and continues this movement during such upward movement of needle 74. At the start of such upward needle movement, element 50 enters the loop of thread produced by needle 74, or arrives at a position between 10 and 11. The thread of the lower looper element is thus extended through the needle loop and thereafter into the path of movement of the upper looper element 42. Upper looper element 42 enters the loop produced by the lower looper element while the overcasting elements are proceeding from position 2 to position 3.

In the further course of the stitch producing process, the upper loop forming element 42, passing around the edge of the associated ply and beyond it, arrives at the position 7. While upper looper element 42 moves from position 6 to position 7, needle 74 is again moving downwardly and enters the loop produced by lower looper element 50 and pulled upwardly by upper looper element 42. This process is repeated with each revolution of driving shaft 30, and thus with each two revolutions of shaft 4, so that a two-thread overcasting stitch is produced. The work is advanced twice during each operation, the advance of the work occurring during the time when the overcasting needle 74 moves from position 5 to position 7 and from position 11 to position 2.

It is also possible to make three-thread overcasting stitches instead of two-thread overcasting stitches. In this event, thread guiding elements must be used instead of the thread loop forming elements 41 and 42. The process of stitch production is essentially the same as described, with the difference being that the upper loop forming element enters the loop of the lower loop forming element and delivers its own loop to the needle.

Feeding of the work is provided by a known feed mechanism. Referring to FIG. 10, an adjusting device 75 is mounted on main shaft 11. Device 75 comprises an adjustable eccentric 76 by which, through the medium of an embracing eccentric follower having rod or arm 77 articulated to a crank arm 78, oscillates a splined shaft 79. An adjusting link 80 within the adjusting device 75, and effective to angularly adjust eccentric 76, is adjustable by means of a stop member 81 operable from the exterior. Stop member 81 is arranged to engage in a notch 82 of member, while the hand wheel of the machine is turned.

Referring to FIG. 9, the front end of shaft 79 has a crank arm 83 secured thereto and to which is articulated a carrier 84 for a feeder 86 operating through stitch plate 85. Feeder 86 receives its lifting movement in a known manner, not shown, from an eccentric mounted on lower main shaft 11 which latter, through an eccentric rod and a lever arm, oscillates a lifting shaft 87 extending in spaced parallel relation to splined shaft 79 below platform 1. The front end of the splined shaft 87 carries a lever arm 88 articulated by a link 89 to one end of carrier 84 to impart a lifting motion to the latter as well as to feeder 86.

The sole 90 of a presser foot 91 operates with feeder 86, and presser foot 91 can be of any suitable form and is secured to the lower end of a spring-loaded presser rod 92. Additionally, devices are provided for feeding thread to the stitch forming elements, for trimming the edges to be overcast, and for separating the two plies for separate application of the overcasting seam, and these devices need not be described further as they form no part of the present invention.

FIG. 11 illustrates the seams produced by the machine of the invention. The two plies 93 and 94 are connected by a two-thread chain stitch connecting seam 95. The edge of upper ply 93 is protected by a two-thread overcast stitch or edge protection or binding seam 96, and the edge of the lower ply 94 is correspondingly protected by a two-thread overcast stitch edging or binding seam 97. The length of the stitches of the edge seams 96 and 97 is twice that of the stitches of the joining seam 95. The joining seam 95 is therefore very tight and durable, whereas the edge protecting seams 96 and 97 have stitch lengths sufficiently great for the required purpose.

The invention also permits a speed reduction of the drive for the overcasting mechanism, as related to the speed of the drive for the chain stitch mechanism, as well as to the feed of the work, in a proportion of 1:3. However, this would necessitate increased expendtiure for the construction of the gear means actuating the deceleration and acceleration of the overcasting needles for synchronizing the motion thereof with the work feeding and the motion of the overcast stitch looping elements. There must also be taken into account that, for a high sewing speed, a high acceleration of the overcasting needle during the time of forming its stitch in the plies must be provided after every third advance of the work.

While a specific embodiment of the invention has been shown and described in detail to illustrate the application of the principles of the invention, it will be understood that the invention may be embodied otherwise without departing from such principles.

What is claimed is:

1. A chain stitch and overcast stitch sewing machine comprising, in combination, chain stitching means, including a chain stitching needle, constructed and arranged to form a chain stitch seam, uniting superposed plies of work material, in spaced substantially parallel relation to corresponding edges of the plies; work feeding means operable in synchronism with said chain stitching means to feed the superposed plies past said chain stitching needle; overcast stitching means constructed and arranged to form a protective seam along at least one of said corresponding ply edges in coordination with the formation of said chain stitch seam, said overcast stitching means including an overcast stitch needle and looping means cooperable with said overcast stitch needle; driving means operating said overcast stitching means at a reduced rate with respect to the rate of operation of said chain stitching means, the ratio of the rate of operation of said overcast stitching means to that of said chain stitching means being a whole number; said driving means oscillating said overcast stitch needle between a first position, in which the point of said overcast stitch needle is spaced substantially from one surface of the work, and a second position, in which the point of said overcast stitch needle is spaced a substantial distance from the opposite surface of the work; said driving means including an oscillatable instrumentality and crank guide means connected thereto and operable to retard the oscillatory movement of said overcast stitch needle in the range of oscillation thereof between said one surface of the work and said first position, and being further operable to accelerate the oscillation rate of said overcast stitch needle in the range of operation thereof between said one surface of the work and said second position to the extent that the work-penetrating stitch formation time of the overcast stitch needle is substantially the same as that of the chain stitch needle.

2. A chain stitch and overcast sewing machine comprising, in combination, chain stitching means, including a chain stitch needle, constructed and arranged to form a chain stitch seam, uniting superposed plies of work material, in spaced substantially parallel relation to corresponding edges of the plies; work feeding means operable in synchronism with said chain stitching means to feed the superposed plies past said stitch needle; overcast stitching means constructed and arranged to form a protective or binding seam along at least one of said corresponding ply edges in coordination with the formation of said chain stitch seam and at a reduced rate with respect to the rate of operation of said chain stitching means, with the ratio of the rate of operation of said overcast stitching means to the rate of operation of said chain stitching means being a whole number; said overcast stitching means including an overcast stitch needle and looping means cooperable with said overcast stitch needle; and driving means for said overcast stitching means oscillating said looping means sinusoidally, said driving means oscillating said overcast stitch needle between a first position, in which its point is spaced substantially from one surface of the work, and a second position in which its point is spaced substantially from a second surface of the work; and arresting gear means included in said driving means and effective to retard the rate of oscillation of said overcast stitch needle in the range between said first position and said one surface of the work, and to accelerate the rate of said oscillation of said overcast stitch needle in the range between said one surface of the work and said second position to an extent such that the work-penetrating stitch formation time of the overcast stitch needle substantially equals that of said chain stitch needle.

3. A chain stitch and overcast stitch sewing machine, as claimed in claim 2, said driving means including a main drive shaft rotated at a substantially constant velocity coordinated with the rate of operation of said chain stitching means; eccentric means interconnecting said main drive shaft and said looping means and operable to effect such sinusoidal oscillation of said looping means; an overcast stitch needle oscillating shaft extending in spaced substantially parallel relation to said main drive shaft; an oscillating member having a pivot end and mounted for oscillation about an axis extending in spaced parallel relation to said main drive shaft, said oscillating member having a free end adjacent said overcast stitch needle oscillating shaft; crank means on said main drive shaft; link means providing a pivotal and slidable connection between said crank means and said oscillating member intermediate the ends of the latter to oscillate said oscillating member about its axis of oscillation in accordance of rotation of said main drive shaft; a crank secured to said overcast stitch needle oscillation shaft; and a link pivotally interconnecting the free end of said crank and the free end of said oscillating member; the construction and relation of parts being such that, in one extreme position of said oscillating member, said crank and said link extend at an angle of substantially 90 degrees relative to each other, and the pivotal connection of said link to the free end of said oscillating member, pivotal connection of said link to said crank, and the axis of oscillation of said oscillating member are substantially in rectilinear alignment.

4. A chain stitch and overcast stitch sewing machine, as claimed in claim 1, in which said overcast stitching mechanism includes a second overcast stitch needle and second looper means cooperable with said second overcast stitch needle, each of said overcast stitch needle being operable on a respective one of the corresponding edges of the plies; a pair of overcast stitch needle oscillating shafts extending in spaced parallel relation to each other and each having a respective one of said overcast stitch needles mounted thereon for oscillation thereby; a pair of cranks, each secured to a respective needle oscillation shaft, said cranks having identical throws; and a link interconnecting the free ends of said cranks and forming therewith a parallel linkage motion whereby said needle oscillating shafts are operated in synchronism.

References Cited

UNITED STATES PATENTS

| | | | |
|---|---|---|---|
| 977,630 | 12/1910 | Hohmann | 112—241 |
| 1,053,841 | 2/1913 | Mack | 112—241 |
| 1,612,821 | 1/1927 | Huber | 112—63 |
| 2,973,730 | 3/1961 | Schweda et al. | 112—163 X |
| 3,121,413 | 2/1964 | Sigoda | 112—200 |
| 3,126,850 | 3/1964 | Sigoda | 112—269 X |
| 3,246,620 | 4/1966 | Sigoda et al. | 112—162 |

PATRICK D. LAWSON, *Primary Examiner.*

JORDAN FRANKLIN, *Examiner.*

J. R. BOLER, *Assistant Examiner.*